Figure 1:
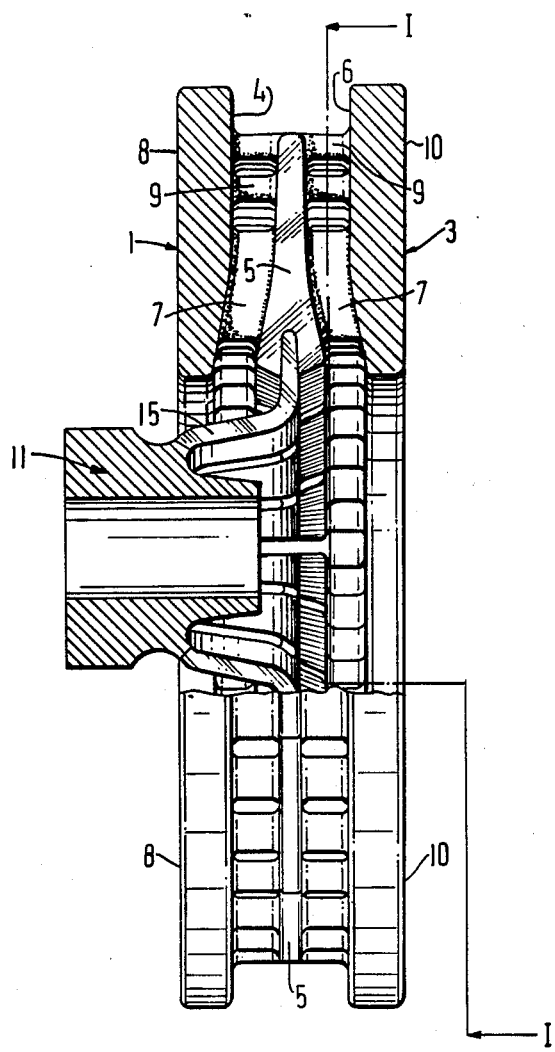

United States Patent [19]

Watson et al.

[11] Patent Number: 4,928,798
[45] Date of Patent: May 29, 1990

[54] DISC FOR DISC BRAKES

[75] Inventors: John C. Watson, Ness; Stephen P. Gaskill, Liverpool; David F. Russell, Hoole, all of England; Robert L. D. Burns, Colwyn Bay, Wales

[73] Assignee: Lucas Industries public limited company, Birmingham, England

[21] Appl. No.: 826,630

[22] Filed: Feb. 6, 1986

[30] Foreign Application Priority Data

Feb. 6, 1985 [GB] United Kingdom ............... 8502954

[51] Int. Cl.⁵ .............................................. F16N 65/10
[52] U.S. Cl. .............................. 188/218 XL; 188/716; 188/264 AA
[58] Field of Search .... 188/218 XL, 264 A, 264 AA, 188/71.6; 192/113 A, 107 R

[56] References Cited

U.S. PATENT DOCUMENTS

| | | | |
|---|---|---|---|
| 2,242,855 | 5/1941 | Flowers | 188/218 XL |
| 3,412,836 | 11/1968 | Wilmer | 188/218 XL |
| 3,899,054 | 8/1975 | Huntress et al. | 188/218 XL |

FOREIGN PATENT DOCUMENTS

| | | | |
|---|---|---|---|
| 493636 | 6/1953 | Canada | |
| 77433 | 3/1983 | European Pat. Off. | 188/218 XL |
| 3320543 | 12/1984 | Fed. Rep. of Germany | 188/218 XL |
| 716895 | 2/1980 | U.S.S.R. | 188/264 AA |

Primary Examiner—Andres Kashnikow
Assistant Examiner—Matthew C. Graham
Attorney, Agent, or Firm—Scrivener and Clarke

[57] ABSTRACT

The present invention provides a disc for a disc brake, the disc comprising two annular members arranged coaxially with respect to each other and joined together by generally radially extending vanes and pillars, which project from a central web located between the annular members. The vanes extend for part of the radial extent of the annular members, and the pillars are located in a region not occupied by the vanes and preferably radially beyond the vanes. Power absorption and noise generation is reduced considerably as a result of the reduced vane overall diameter, as compared to a disc of like diameter with the conventional long radial vanes. However, the desired cooling is maintained due to the surface area presented by the combination of shorter vanes and pillars.

10 Claims, 2 Drawing Sheets

DISC FOR DISC BRAKES

The present invention relates to a disc for a disc brake.

In particular the present invention relates to a disc of the type comprising two annular members arranged coaxially with respect to each other and joined together by generally radially extending vanes which project from a central web located between said annular members. The central web can be integrally formed with or attached by suitable means e.g. casting, welding, or bolts, to a central hub. Said vanes extend for the major part of the radial extent of said annular members, so that as the disc rotates, air is pumped between the vanes, cooling the disc and dissipating heat produced by braking, thereby encouraging stability in braking and extending brake pad and disc life by reducing thermal degradation.

The above type of disc is especially suited for use on railway vehicles in which the disc may be mounted on the axle of a railway wheelset or on a rotating part of the vehicle drive system. In the case of high speed vehicles or those in which the aforesaid part of the drive system rotates at high speed, the disc cooling characteristics are particularly advantageous. However, a quantity of power is absorbed in rotatably driving the disc, this being associated with the air pumping resistance, and it is advantageous to design such discs so that power absorption is minimised.

Another problem with high speed discs of the above type is that of noise, generated by the generally radial vanes in the manner of a siren. Thus the vane design is important on this aspect.

The aim of the present invention is to provide a ventilated disc for a disc brake, which for a particular disc diameter, reduces both power absorption and noise as compared to known discs of the same diameter, but which maintains the required cooling.

According to the present invention there is provided, a disc for a disc brake comprising two annular members arranged coaxially with respect to each other and joined together by generally radially extending vanes, and pillars, which project from a central web located between said annular members, said vanes extending for part of the radial extent of said annular members, and said pillars being located in a region not occupied by the vanes.

By virtue of the construction of the present invention, power absorption is reduced considerably and as a result of the reduced overall vane diameter, the noise level produced, is reduced, as compared to a disc of like diameter with the conventional long, generally radial vanes. Further, the pillar design spacing, shape and/or arrangement can reduce the noise generated. This is particularly the case when the disc is rotated at high speeds. However, the desired cooling is maintained due to the surface area being of suitable magnitude by virtue of the combination of the shorter vanes and pillars.

In one embodiment of the present invention, the vanes are arranged generally radially, in groups of three parallel vanes. The pillars are elliptical in cross-section both to optimise the available surface area and aid manufacture, and are arranged in two circumferential rows, radially beyond the vanes. Adjacent pillars of the two rows lie on the same general radius with respect to said annular members, together with one of said vanes. However, the pillars of one or both circumferential rows, can alternatively be circumferentially offset from each other and/or the vanes, to thus provide a tortuous path for the air flow between the annular members. Further the cross-sectional shape of the pillars can be modified as desired.

In operation at a particular speed, said one embodiment of the present invention absorbs one third of the power absorbed by a disc of like diameter with larger vanes. Thus, the power saving is immediately obvious. Further, the noise generated by the rotating disc is considerably reduced.

Figure 2:
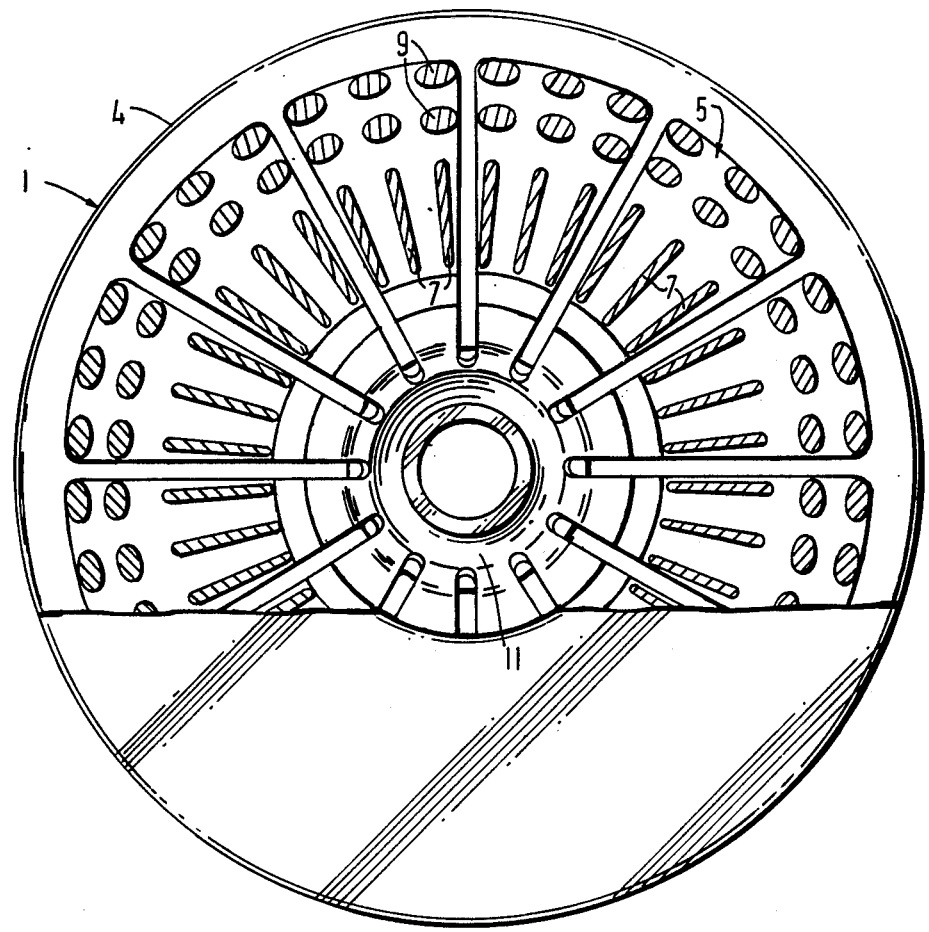

The present invention will now be further described, by way of example, with reference to the accompanying drawings, in which:

FIG. 1 is a partially cutaway side elevation of one embodiment of a disc constructed according to the present invention; and FIG. 2 is a front elevation of the embodiment of FIG. 1 cutaway along line I—I.

The disc illustrated in the accompanying drawings is especially suited for use in a railway vehicle. The disc comprises two annular members 1,3, which are coaxially aligned with respect to each other, the facing surfaces 4,6 of each annular member 1,3, being attached to a segmented central annular web 5 by vanes 7 and pillars 9. The other annular surfaces 8,10 of the annular members 1,3 are in use, engaged by brake pads. The segments of web 5 are attached to a central hub 11 which, in use, can be mounted on a railway vehicle axle or rotating part of the drive system.

The vanes 7 extend generally radially with respect to said annular members 1,3, for part of the radial extent of said annular members 1,3, and are arranged in groups of three. The vanes in a group can be parallel to each other or each independently positioned and angled relative to each other.

Radially beyond the vanes 7 are two circumferential rows of pillars 9. The pillars are each elliptical in transverse cross-section, this being to optimise the surface area available for cooling, and to aid the chosen manufacturing technique. Alternatively, however, the pillars 9 can have any desired transverse cross-section.

Further, as evident from FIG. 2 of the accompanying drawings, adjacent pillars from the two circumferential rows, are arranged to lie on a common radius with respect to the said annular members 1,3, together with one of said vanes 7. Alternatively, the pillars 9 can be circumferentially offset with respect to the vanes and/or with respect to each other, to thus provide a tortuous path for the cooling air.

With the above-described and illustrated disc design, power absorption is approximately one third compared with that of a known disc construction of the same diameter with long generally radial vanes. This reduction can form a significant saving in the overall propulsion energy of a train of railway vehicles. Further, there is also a considerable reduction in noise generated by the disc. This is primarily due to the reduction in the overall vane diameter. However, noise reduction can be further enhanced by pillar design, spacing, shape and/or arrangement.

Thus, the present invention provides a simple disc design which primarily reduces power absorption and thus enables more power to be available for the drive, when mounted, for example, on the drive shaft of an electric motor in, for example, a railway vehicle drive. The added advantage of a reduction in noise is also provided.

We claim:

1. A disc for a disc brake comprising two annular members arranged coaxially with respect to each other and with respect to a central hub, a central web radiating from the central hub and extending between said annular members, generally radially extending vanes projecting from each side of the central web and interconnecting said central web with each said annular members, and pillars separate and distinct from said vanes and also projecting from each side of the central web and interconnecting said central web with each said annular member, said vanes extending for part of the radial extent of said annular members, and each of said pillars having a radial extent less than said vanes and being located in a radial region not occupied by said vanes.

2. A disc according to claim 1, wherein the vanes are arranged in groups of three vanes, the vanes in each group being parallel to each other.

3. A disc according to claim 2, wherein the central web is formed by a number of generally radially extending segments, a group of vanes being located on each segment.

4. A disc according to claim 3, wherein said segments are mounted on a central hub at cicumferentially spaced apart locations.

5. A disc according to claim 1, wherein two circumferential rows of pillars are located radially beyond the vanes.

6. A disc according to claim 5, wherein adjacent pillars of the two rows lie on the same general radius with respect to said annular members, together with one of said vanes.

7. A disc according to claim 5, wherein the pillars of said rows are radially offset from each other.

8. A disc according to claim 5, wherein the pillars are radially offset wth respect to the vanes.

9. A disc according to claim 1, wherein the pillars are elliptical in cross-section.

10. A disc for a disc brake comprising two coaxially spaced annular members each having inner and outer faces, said members being arranged coaxially with respect to each other and with respect to a central hub, a central web radiating from the central hub and extending into the space between said annular members, said web having opposed faces each axially spaced from an inner face of a respective annular member, generally radially extending vanes projecting from each face of said central web and interconnecting said central web with the respective inner faces of said annular members, and pillars separate and distinct from said vanes and also projecting from each face of the central web and interconnecting said central web with the respective inner faces of said annular members, said vanes extending for part of the radial extent of said annular members, and each of said pillars having a radial extent less than said vanes and being located in a radial region not occupied by said vanes.

* * * * *